United States Patent
Mokhtari-Koushyar et al.

(10) Patent No.: US 11,838,056 B2
(45) Date of Patent: Dec. 5, 2023

(54) HYBRID PHOTONIC INTEGRATED CIRCUITS FOR ULTRA-LOW PHASE NOISE SIGNAL GENERATORS

(71) Applicant: GENXCOMM, INC., Austin, TX (US)

(72) Inventors: Farzad Mokhtari-Koushyar, Austin, TX (US); Thien-An Nguyen, Austin, TX (US); Taran Huffman, Austin, TX (US); Brian Mattis, Austin, TX (US)

(73) Assignee: GenXComm, Inc., Austin, TX (US)

( * ) Notice: Subject to any disclaimer, the term of this patent is extended or adjusted under 35 U.S.C. 154(b) by 0 days.

(21) Appl. No.: 17/737,178

(22) Filed: May 5, 2022

(65) Prior Publication Data
US 2023/0130434 A1 Apr. 27, 2023

Related U.S. Application Data

(60) Provisional application No. 63/271,703, filed on Oct. 25, 2021.

(51) Int. Cl.
*H04B 10/508* (2013.01)
*G02B 6/12* (2006.01)
*H04B 10/50* (2013.01)
*G02B 6/293* (2006.01)

(52) U.S. Cl.
CPC ....... *H04B 10/508* (2013.01); *G02B 6/12004* (2013.01); *G02B 6/12007* (2013.01); *H04B 10/503* (2013.01); *G02B 6/29352* (2013.01); *G02B 2006/12061* (2013.01)

(58) Field of Classification Search
CPC ............. H04B 10/503; G02B 6/12004; G02B 6/12007

USPC ........................................................ 398/200
See application file for complete search history.

(56) References Cited

U.S. PATENT DOCUMENTS

| | | | |
|---|---|---|---|
| 4,608,569 A | 8/1986 | Dickey, Jr. et al. | |
| 5,377,289 A | 12/1994 | Johnson | |
| 5,444,864 A | 8/1995 | Smith | |
| 5,578,845 A | 11/1996 | Yoshiyuki et al. | |
| 5,699,176 A | 12/1997 | Cohen | |
| 5,701,371 A | 12/1997 | Ishida | |
| RE35,736 E | 2/1998 | Powell | |
| 5,757,312 A | 5/1998 | Szmurlo | |

(Continued)

FOREIGN PATENT DOCUMENTS

| CN | 101379718 | 3/2009 |
|---|---|---|
| CN | 104484852 | 4/2015 |

(Continued)

OTHER PUBLICATIONS

Xue et al; Micro resonator Frequency Combs for Integrated Microwave Photonics; Nov. 2018; IEEE; pp. 1-4. (Year: 2018).*

(Continued)

*Primary Examiner* — Amritbir K Sandhu
(74) *Attorney, Agent, or Firm* — Brownstein Hyatt Farber Schreck, LLP

(57) ABSTRACT

A signal generator includes a photonic circuit configured to output a sequence of solitons at a known rate. The solitons illuminate a high-speed photodiode that, in response, generates an electrical signal, such as a sinusoidal signal, which can be provided as input to a direct digital synthesizer configured to output successive phases of a selected waveform in response to electrical stimulus.

20 Claims, 8 Drawing Sheets

(56) References Cited

U.S. PATENT DOCUMENTS

| | | |
|---|---|---|
| 5,867,293 A | 2/1999 | Kotten |
| 5,904,546 A | 5/1999 | Wood et al. |
| 6,359,714 B1 | 3/2002 | Imajo |
| 6,373,909 B2 | 4/2002 | Lindquist |
| 6,507,728 B1 | 1/2003 | Watanabe |
| 6,539,204 B1 | 3/2003 | Marsh |
| 6,567,648 B1 | 5/2003 | Ahn |
| 6,567,649 B2 | 5/2003 | Souissi |
| 6,745,018 B1 | 6/2004 | Zehavi |
| 6,751,447 B1 | 6/2004 | Jin |
| 6,760,454 B1 | 7/2004 | Shreve |
| 6,771,931 B2 | 8/2004 | Waltho |
| 6,778,319 B2 | 8/2004 | Chavez-Pirson |
| 6,873,639 B2 | 3/2005 | Zhang |
| 6,907,093 B2 | 6/2005 | Blount |
| 6,999,639 B2 | 2/2006 | Tsarev |
| 7,020,396 B2 | 3/2006 | Izadpanah |
| 7,058,368 B2 | 6/2006 | Nicholls |
| 7,064,697 B2 | 6/2006 | Taylor et al. |
| 7,085,497 B2 | 8/2006 | Tiemann |
| 7,116,484 B2 | 10/2006 | Nemoto |
| 7,123,676 B2 | 10/2006 | Gebara |
| 7,130,289 B2 | 10/2006 | Kuan et al. |
| 7,204,647 B2 | 4/2007 | Ohm |
| 7,355,993 B2 | 4/2008 | Adkins |
| 7,366,244 B2 | 4/2008 | Gebara |
| 7,446,601 B2 | 11/2008 | LeChevalier |
| 7,496,257 B2 | 2/2009 | Levner |
| 7,509,054 B2 | 3/2009 | Calabro et al. |
| 7,566,634 B2 | 7/2009 | Beyne et al. |
| 7,650,080 B2 | 1/2010 | Yap |
| 7,660,531 B2 | 2/2010 | Lee |
| 7,672,643 B2 | 3/2010 | Loh |
| 7,680,368 B2 | 3/2010 | Welch et al. |
| 7,711,329 B2 | 5/2010 | Aparin |
| 7,720,029 B2 | 5/2010 | Orava |
| 7,729,431 B2 | 6/2010 | Gebara |
| 7,756,480 B2 | 7/2010 | Loh |
| 7,778,611 B2 | 8/2010 | Asai |
| 7,809,047 B2 | 10/2010 | Kummetz |
| 7,826,808 B2 | 11/2010 | Faulkner |
| 7,853,195 B2 | 12/2010 | Higgins |
| 7,869,527 B2 | 1/2011 | Vetter |
| 7,876,867 B2 | 1/2011 | Filipovic |
| 7,907,895 B2 | 3/2011 | Shinagawa |
| 7,917,177 B2 | 3/2011 | Bauman |
| 8,036,606 B2 | 10/2011 | Kenington |
| 8,055,235 B1 | 11/2011 | Gupta et al. |
| 8,078,130 B2 | 12/2011 | Fudge |
| 8,081,946 B2 | 12/2011 | Fudge |
| 8,098,779 B2 | 1/2012 | Komninakis et al. |
| 8,155,605 B2 | 4/2012 | Hwang |
| 8,170,487 B2 | 5/2012 | Sahota et al. |
| 8,233,872 B2 | 7/2012 | Nagai |
| 8,249,540 B1 | 8/2012 | Gupta |
| 8,270,843 B2 | 9/2012 | Nakamoto |
| 8,299,555 B2 | 10/2012 | Su et al. |
| 8,320,504 B2 | 11/2012 | Peng |
| 8,331,509 B2 | 12/2012 | Wang |
| 8,351,874 B2 | 1/2013 | Dent |
| 8,477,871 B2 | 7/2013 | Neumann |
| 8,521,090 B2 | 8/2013 | Kim |
| 8,526,903 B2 | 9/2013 | Gudem |
| 8,564,869 B1 * | 10/2013 | Mohageg ............ G02F 1/0123 359/278 |
| 8,565,681 B2 | 10/2013 | Kim |
| 8,600,200 B1 | 12/2013 | Rakich et al. |
| 8,618,966 B2 | 12/2013 | Kanter |
| 8,682,170 B2 | 3/2014 | Prucnal |
| 8,693,810 B2 | 4/2014 | Suarez et al. |
| 8,730,786 B2 | 5/2014 | Wang |
| 8,781,030 B2 | 7/2014 | Peng |
| 8,785,332 B2 | 7/2014 | Johnson et al. |
| 8,804,231 B2 * | 8/2014 | Savchenkov ......... H01S 3/1304 372/32 |
| 8,805,298 B2 | 8/2014 | McCallister |
| 8,845,854 B2 | 9/2014 | Lei et al. |
| 8,867,928 B2 | 10/2014 | Piehler |
| 8,872,583 B2 | 10/2014 | Lee |
| 8,971,712 B2 | 3/2015 | Fan et al. |
| 8,977,223 B1 | 3/2015 | Gupta |
| 9,020,307 B2 | 4/2015 | Ishikawa |
| 9,077,440 B2 | 7/2015 | Wyville |
| 9,100,099 B2 | 8/2015 | Loh |
| 9,106,453 B2 | 8/2015 | Wang |
| 9,160,386 B2 | 10/2015 | Rimini |
| 9,178,635 B2 | 11/2015 | Ben-Shlomo |
| 9,184,902 B2 | 11/2015 | Khojastepour |
| 9,195,052 B2 | 11/2015 | Long |
| 9,214,718 B2 | 12/2015 | Mow |
| 9,224,650 B2 | 12/2015 | Lei et al. |
| 9,252,857 B2 | 2/2016 | Negus |
| 9,253,003 B1 | 2/2016 | Harel |
| 9,257,811 B2 | 2/2016 | Gao |
| 9,258,052 B2 | 2/2016 | George |
| 9,268,092 B1 | 2/2016 | Jarecki, Jr. |
| 9,310,562 B2 * | 4/2016 | Zheng ................ G02B 6/29341 |
| 9,312,895 B1 | 4/2016 | Gupta |
| 9,344,125 B2 | 5/2016 | Kpodzo |
| 9,344,139 B2 | 5/2016 | Sjoland |
| 9,385,268 B2 | 7/2016 | Minamiru et al. |
| 9,391,667 B2 | 7/2016 | Sundstrom |
| 9,438,288 B2 | 9/2016 | Feld |
| 9,450,623 B2 | 9/2016 | Weissman |
| 9,490,963 B2 | 11/2016 | Choi |
| 9,503,134 B2 | 11/2016 | Sadek et al. |
| 9,520,983 B2 | 12/2016 | Choi et al. |
| 9,520,985 B2 | 12/2016 | Choi |
| 9,571,205 B1 | 2/2017 | Suarez |
| 9,589,812 B2 | 3/2017 | Takahashi et al. |
| 9,602,149 B1 | 3/2017 | Tanzi |
| 9,608,718 B2 | 3/2017 | Monsen |
| 9,651,652 B2 | 5/2017 | Kpodzo et al. |
| 9,667,404 B2 | 5/2017 | Sjoland |
| 9,696,492 B1 | 7/2017 | Cox |
| 9,698,913 B2 | 7/2017 | Foster |
| 9,703,046 B2 | 7/2017 | Paquet |
| 9,703,056 B2 | 7/2017 | Neelakantan et al. |
| 9,712,233 B1 | 7/2017 | Deng |
| 9,722,713 B2 | 8/2017 | Tanzi |
| 9,723,612 B2 | 8/2017 | Stapleton |
| 9,726,821 B2 | 8/2017 | Murray et al. |
| 9,735,056 B2 | 8/2017 | Takahashi et al. |
| 9,748,906 B2 | 8/2017 | Stewart |
| 9,768,852 B2 | 9/2017 | Ling |
| 9,774,364 B2 | 9/2017 | Shih |
| 9,775,123 B2 | 9/2017 | Harel |
| 9,793,943 B2 | 10/2017 | Sjoland |
| 9,793,992 B2 | 10/2017 | Hino |
| 9,807,700 B2 | 10/2017 | Harel |
| 9,831,898 B2 | 11/2017 | Pratt |
| 9,847,258 B2 | 12/2017 | Rohleder et al. |
| 9,871,552 B2 | 1/2018 | Din |
| 9,885,806 B2 | 2/2018 | Steinhardt |
| 9,885,825 B2 | 2/2018 | Kopp |
| 9,887,862 B2 | 2/2018 | Zhou et al. |
| 9,900,044 B2 | 2/2018 | Sjoland |
| 9,923,593 B2 | 3/2018 | Andersson |
| 9,923,708 B2 | 3/2018 | Khandani |
| 9,948,377 B1 | 4/2018 | Kim et al. |
| 9,960,805 B2 | 5/2018 | Wyville |
| 9,960,850 B2 | 5/2018 | Daniel |
| 9,967,014 B1 | 5/2018 | Park et al. |
| 9,973,282 B2 | 5/2018 | Welch |
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Kanter |
| 10,064,217 B2 | 8/2018 | Rajagopal et al. |
| 10,084,506 B2 | 9/2018 | Sjoland |
| 10,110,306 B2 | 10/2018 | Jain et al. |
| 10,177,836 B2 | 1/2019 | Hong |

(56) References Cited

U.S. PATENT DOCUMENTS

| | | | |
|---|---|---|---|
| 10,187,158 | B2 | 1/2019 | Kikuchi |
| 10,191,217 | B2 | 1/2019 | Boutami |
| 10,257,746 | B2 | 4/2019 | Jain et al. |
| 10,284,367 | B1 | 5/2019 | Le Ngoc |
| 10,321,357 | B1 | 6/2019 | Jain et al. |
| 10,325,861 | B2 | 6/2019 | Miccoli |
| 10,341,028 | B2 | 7/2019 | Kanter |
| 10,356,782 | B2 | 7/2019 | Negus |
| 10,367,584 | B2 | 7/2019 | Rakich |
| 10,418,775 | B2 | 9/2019 | Gao |
| 10,439,287 | B2 | 10/2019 | Ashrafi |
| 10,491,313 | B2 | 11/2019 | Jain |
| 10,656,350 | B2 | 5/2020 | Chen et al. |
| 10,663,663 | B2 | 5/2020 | Painchaud |
| 10,673,519 | B2 | 6/2020 | Hong |
| 10,727,945 | B1 | 7/2020 | Nguyen et al. |
| 10,754,091 | B1* | 8/2020 | Nagarajan ............... G02B 6/126 |
| 10,873,877 | B2 | 12/2020 | Jain et al. |
| 11,032,005 | B2 | 6/2021 | Vishwanath et al. |
| 11,032,737 | B2 | 6/2021 | Jain et al. |
| 11,159,498 | B1 | 10/2021 | Mattis et al. |
| 11,215,755 | B2 | 1/2022 | Liu et al. |
| 11,330,464 | B2 | 5/2022 | Jain et al. |
| 11,330,591 | B2 | 5/2022 | Raghothaman et al. |
| 11,469,821 | B2 | 11/2022 | Jain et al. |
| 11,539,394 | B2 | 12/2022 | Roberts et al. |
| 11,594,851 | B2* | 2/2023 | Kozlov ................... H01S 3/083 |
| 2003/0161637 | A1 | 8/2003 | Yamamoto |
| 2004/0151238 | A1 | 8/2004 | Masenten |
| 2004/0264610 | A1 | 12/2004 | Marro |
| 2011/0065408 | A1 | 3/2011 | Kenington |
| 2011/0065409 | A1 | 3/2011 | Kenington |
| 2011/0134810 | A1 | 6/2011 | Yamamoto et al. |
| 2012/0039346 | A1* | 2/2012 | Liang ................... H01S 5/1075 372/20 |
| 2013/0295980 | A1 | 11/2013 | Reuven |
| 2014/0169236 | A1 | 6/2014 | Choi |
| 2014/0177660 | A1 | 6/2014 | Elmaanaoui |
| 2015/0207296 | A1* | 7/2015 | Rickman ................. H01S 5/021 372/20 |
| 2016/0103341 | A1 | 4/2016 | Long |
| 2017/0176780 | A1 | 6/2017 | Levy et al. |
| 2018/0006795 | A1 | 1/2018 | Raaf |
| 2018/0248627 | A1 | 8/2018 | Daniel |
| 2019/0341739 | A1* | 11/2019 | Loh ....................... H01S 3/2383 |
| 2020/0304253 | A1 | 9/2020 | Choi et al. |
| 2021/0057880 | A1* | 2/2021 | Mehta .................... H01S 5/142 |
| 2022/0263529 | A1 | 8/2022 | Kokel et al. |
| 2022/0404550 | A1* | 12/2022 | Soltani ................. H01S 3/1086 |

FOREIGN PATENT DOCUMENTS

| | | | |
|---|---|---|---|
| CN | 110729630 A * | 1/2020 | |
| EP | 3561561 | 10/2019 | |
| GB | 2139374 | 11/1984 | |
| JP | 2002214461 | 7/2002 | |
| JP | 2004048200 | 2/2004 | |
| JP | 2006301415 | 11/2006 | |
| JP | A 2011120120 | 6/2011 | |
| JP | A 2013110510 | 6/2013 | |
| RU | 2474056 | 1/2013 | |
| WO | WO 06/072086 | 7/2006 | |
| WO | WO 07/092767 | 8/2007 | |
| WO | WO 08/036356 | 3/2008 | |
| WO | WO 12/112357 | 8/2012 | |
| WO | WO 16/118079 | 7/2016 | |

OTHER PUBLICATIONS

Huffman, T.A. et al., "Integrated Resonators in an Ultralow Loss $Si_3N_4/SiO_2$ Platform for Multifunction Applications" (Jul./Aug. 2018) IEEE Journal of Selected Topics in Quantum Electronics vol. 24, No. 4 (9 pages).

Blumenthal, D.J., "Photonic integration for UV to IR applications" (2020) APL Photonics 5: 020903 (12 pages).

Amiri, I.S. et al., "2X2 MIMO-OFDM-RoF generation and transmission of double V-Band signals using a microring resonator system" (Dec. 12, 2015) Optical and Quantum Electronics, Springer US, NY vol. 48:1 1-15.

Amiri, I.S. et al., "W-Band OFDM Transmission for Radio-Over-Fiber Link Using Solitonic Millimeter Wave Generated by MRR" (Aug. 2014) IEEE Journal of Quantum Electronics 50(8): 622-628.

Zhu, D. et al., "Integrated photonics on thin-film lithium niobate" (Feb. 23, 2021) arxiv.org, Cornell University Library, 201 Olin Library Cornell University Ithaca, NY 14853 (94 pages).

International Search Report and Written Opinion dated Aug. 18, 2022 in corresponding International Application No. PCT/US2022/0277821.

Chang et al., "Full-duplex spectrum sensing in cognitive radios using optical self-interference cancellation," 2015 9th International Conference on Sensing Technology (ICST), IEEE, pp. 341-344, Dec. 8, 2015.

IBM, "Silicon Nanophotonic Packaging," https://researcher.watson.ibm.com/researcher/view_group_subpage.php?id=5522, Jul. 2016.

Kwak, MyoungJun, "The Impact of Loop Filter in Phase Locked Loop," Bachelor's Thesis Metropolia University of Applied Sciences, Feb. 19, 2019, 50 pages.

Lecture 150—Phase Noise—I (Jun. 20, 2003), P.E. Allen 2003, 2 pages.

Li et al., "Multimode silicon photonics," Nanophotonics, vol. 8, No. 2, pp. 227-247, May 16, 2019.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

Mothe et al., "Multichannel Microwave Photonics Signals Summation Device," IEEE Photonics Technology Letters, vol. 3, No. 3, pp. 140-142, Feb. 1, 2011.

Quan et al., "A Novel Phase Noise Mitigation Method for Full-Duplex Transceivers" 2019 11th International Conference on Wireless Communications and Signal Processing (WCSP) IEEE Oct. 23, 2019 pp. 1-6.

Sahai et al., "Understanding the Impact of Phase Noise on Active Cancellation in Wireless Full-Duplex" Asilomar Conference on Signals, Systems and Computers Conference Record, IEEE Computer Society pp. 29-33 Nov. 12, 2012.

Skyworks AN279, "Estimating Period Jitter from Phase Noise," Skyworks Solutions, Inc., Sep. 21, 2021, 8 pages.

Syrjälä et al., "Analysis of Oscillator Phase-Noise Effects on Self-Interference Cancellation in Full-Duplex OFDM Radio Transceivers" IEEE Transactions on Wireless Communications vol. 13, No. 6, pp. 2977-2990 Jun. 6, 2014.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," Journal of Lightwave Technology, vol. 34, No. 20, pp. 4715-4721, Oct. 15, 2016.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Yoo et al., "Heterogeneous 2D/3D photonic integrated microsystems," Microsystems & Nanoengineering, 2, 16030, Aug. 2016.

* cited by examiner

HYBRID PHOTONIC INTEGRATED CIRCUITS FOR ULTRA-LOW PHASE NOISE SIGNAL GENERATORS

CROSS-REFERENCE TO RELATED APPLICATION(S)

This application is a nonprovisional of, and claims the benefit under 35 U.S.C. 119(e) to U.S. Provisional Patent Application No. 63/271,703, filed Oct. 25, 2021, and entitled "Integrated Ultra-Low Phase Noise Photonics for Frequency Comb and Microwave Signal Generation," the contents of which are incorporated herein by reference as if fully disclosed herein.

TECHNICAL FIELD

Embodiments described herein relate to small form-factor signal generators and, in particular, to a hybrid photonic integrated circuit, and methods for manufacturing the same, configured to serve as a stable periodic signal source to drive a phase accumulator input of a direct digital synthesizer.

BACKGROUND

Microwave signal generators are used in many applications to produce reference signals, carrier signals, and clock signals. Some conventional electronic microwave signal generators leverage frequency multiplication techniques that exhibit undesirable phase noise in many output frequency bands. In addition, conventional electronic microwave signal generators are typically performance-limited (and/or bandwidth-limited) by one or more properties of the electronic components from which they are made. As a result, high-performance, low phase-noise electronic microwave signal generators are typically expensive, heavy, large, benchtop devices that are not suitable for many applications.

Other conventional microwave signal generators leverage optical elements and laser light sources. These conventional photonic microwave signal generators are highly sensitive to environmental conditions, such as vibration, particles, and temperature. In addition, such systems are highly sensitive to laser relative intensity noise and require broad-band high-speed photodiodes to provide electronic output, which may be undesirably expensive and subject to band-specific performance.

SUMMARY

Embodiments described herein take the form of a signal generator. Although not expressly required, many implementations of embodiments described herein can be leveraged to generate microwave signals with a center frequency falling between approximately 300 MHz and 300 GHz. In other cases, a signal generator as described herein can operate in different bands, such as radio frequency bands lower than microwave bands.

A microwave signal generator, as described herein, includes a controller operably coupled to a photonic integrated circuit. The photonic integrated circuit is configured to provide a stable soliton pulse train output as optical input to a high-speed photodiode (which may be integrated or discrete). In response, the high-speed photodiode provides, as output, a high frequency, stable, electrical clock signal. In particular, output of the photodiode can be conductively and/or otherwise operably coupled to a phase accumulator input of a direct digital synthesizer (DDS), configured to produce a periodic output at a particular frequency in the microwave band.

In many embodiments, the photonic integrated circuit of a microwave signal generator as described herein includes a laser light source configured to output narrow line width laser light at center frequency referred to herein as an optical carrier frequency. The laser light source may be a distributed feedback laser. The laser light source is optically coupled (via a photonic wire bond, a tapered waveguide, a lens array, or any other suitable optical coupling) to a first waveguide, which can be formed from a material such as silicon nitride. As a result of this construction, laser light output from the laser light source can be confined within the first waveguide.

A wavelength locking resonator, which may be a ring resonator, is positioned adjacent to the first waveguide. As a result of this construction, a portion of light confined by the first waveguide couples into the wavelength locking resonator. Light confined by, and resonating within, the wavelength locking resonator thereafter interacts with, and interferes with, light confined by the first waveguide. More specifically, line width of light confined by the first waveguide may be further narrowed by interaction with the wavelength locking resonator.

After linewidth narrowing by the wavelength locking resonator (and/or another component such as a Bragg grating or filter), light confined by the first waveguide can couple into a Mach-Zehner Interferometer (MZI) structure that can be leveraged by the controller of the microwave signal generator to further tune amplitude, phase, and/or frequency of linewidth-narrowed light confined by the first waveguide. In some cases, an MZI may not be required.

A high-Q optical resonator, which may be a multimode or single mode resonator, is positioned adjacent to the first waveguide. As a result of this construction, output of the MZI confined by the first waveguide can optically couple at least a portion of its contained light into the high-Q resonator. Light confined within, and moving through, the high-Q resonator can thereafter couple (via any suitable optical coupling) back into the first waveguide and/or interact with, and/or interfere with, linewidth-narrowed light confined by the first waveguide. More specifically, as a result of the resonant operation of the high-Q resonator, a soliton pulse train is introduced into the first waveguide. In other cases, the soliton pulse train may be introduced into a different waveguide from the first waveguide, although this is not required of all embodiments.

The soliton pulse train, confined by the first waveguide (or another waveguide, which may convey the soliton pulse train from the resonator to another optical circuit) after interacting with the high-Q resonator, can be thereafter optically coupled into a second filtering resonator that serves to further extract any residual optical carrier spectral content, further refining the spectral content of each soliton of the soliton pulse train.

The refined soliton pulse train is thereafter optically coupled to the high speed photodiode, which, when excited by a refined soliton of the soliton pulse train, generates as output a low phase noise sinusoidal wave. As noted above, this signal is provided as input to a phase accumulator input of the DDS, thereby causing an analog output of the DDS to transition to the next angular value of the particular periodic waveform that the DDS is configured to output.

In addition, in many embodiments, a second waveguide may be positioned adjacent to the first waveguide so as to direct a portion of the refined soliton pulse train into a reference photodiode, and output from which may be provided as input to the controller. The controller may leverage this input to adjust one or more operational parameters of the photonic integrated circuit, such as current through a heating element positioned along one arm of the MZI.

Further embodiments described herein reference methods for manufacturing a photonic integrated circuit of a signal generator, such as described above. In particular, a method can include the operations of: forming a waveguide from one of silicon nitride or silicon; forming a first resonator within a threshold distance of a direction of propagation of the waveguide; forming a second resonator within the threshold distance of a direction of propagation of the waveguide, after the first resonator; forming a deep trench cavity between the first resonator and the second resonator; disposing a master resonator within the deep trench cavity; optically coupling the master resonator to the first waveguide; and optically coupling the waveguide to a laser light source. In some embodiments, the method can further include optically coupling (e.g., via a photonic wirebond, optical coupling, and so on) the photonic integrated circuit to a high-speed photodiode which in turn is conductively coupled to a phase accumulator port of a direct digital synthesizer.

Further embodiments include a configuration in which the laser light source is a distributed feedback laser light source that is optically coupled to the waveguide by a photonic wire bond.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
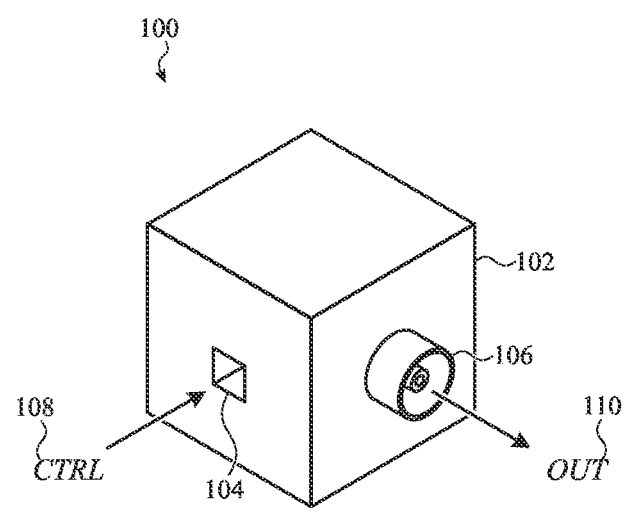
FIG. 1 depicts a signal generator adopting a small form-factor, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to small form-factor signal generators with a capability to output signals that are frequency stable and that exhibit exceptionally low phase noise, and that may be tuned to output any suitable frequency, whether that output frequency is significantly higher or significantly lower than internal clock signals or reference signals. More simply, embodiments described herein can be configured to output any suitable periodic signal, such as a sinusoidal signal, with exceptionally low phase noise and frequency stability especially when compared against conventional electrical signal generators (which typically exhibit frequency-dependent phase noise or frequency instability) or optical signal generators (which typically command a large form factor and are not suitable for many use cases).

More specifically, signal generators as described herein leverage a laser-energized photonic integrated circuit configured to output a well-defined, stable, optical frequency comb. As known to a person of skill in the art, an optical frequency comb corresponds, in the time domain, to a train of short pulses of light, precisely spaced at a time interval defined by properties of the optical frequency comb itself.

These precisely-spaced pulses of light—which in many embodiments may be solitons of light—can be leveraged to excite a high speed photodiode, which outputs a frequency stable sinusoidal wave (also referred to as a "tone") in response to each received pulse of light. This tone can thereafter be provided as a clock input to a phase accumulator port of a direct digital synthesizer, configured to sequentially output samples of a given periodic waveform, such as a sinewave, square wave, triangular wave, or any other periodic waveform. Output of the direct digital synthesizer can be provided as an output of the signal generator.

As may be appreciated in view of the description provided herein, the frequency and phase stability provided by the photonic integrated circuit translates to low (or ultra-low) phase noise operation of the direct digital synthesizer, even when transitioning between output frequencies.

More simply, signal generator embodiments described herein can be configured to output, in a frequency-stable manner and low phase-noise manner, any suitable analog periodic waveform having a center frequency in any suitable output band, while also being substantially more tolerant to environmental condition changes (e.g., temperature), vibrations, and/or particle blockages as compared to conventional signal generators and while also consuming substantially less electrical power.

Furthermore, although not required, in many embodiments, a signal generator as described herein can be implemented in small form-factor, and efficiently manufactured in a cost-effective manner. For example, many embodiments can be disposed within a housing or other enclosure occupying less than 10 cubic centimeters. As a result of the small form-factor, embodiments described herein can be incorporated into a number of applications unsuitable for conventional signal generators such as, but not limited to: satellite applications; compact sensors; high-bandwidth/high-performance wireless communications devices; spectroscopic sensors and applications; metrology systems; radar systems; LIDAR systems; continuous wave radar/LIDAR systems (e.g., frequency-modulated continuous wave systems); ranging systems; time-of-flight systems; geolocation systems; supercomputing applications; computing applications; personal and/or industrial electronic devices; and/or any other suitable computing device, computing network, or computing resource.

As noted above, a signal generator as described herein can be configured to output any suitable periodic waveform with any suitable center frequency or shape. As such, for simplicity of description, the embodiments that follow reference an implementation in which a signal generator as described herein is a microwave signal generator configured to output a sinusoidal wave within the microwave frequency band. As noted above, as used herein the phrase "microwave frequency band" refers to frequencies between approximately 300 MHz and 300 GHz. In other embodiments, higher or lower frequency sinusoids may be output from a signal generator as described herein. In other embodiments, square waves may be output from a signal generator as described herein.

Further to the examples introduced above, a microwave signal generator, as described herein, includes a controller operably coupled to a photonic integrated circuit. The controller can be configured to receive feedback from the photonic integrated circuit and to, based on that feedback, adjust one or more operational parameters of the photonic integrated circuit so as to maintain environment, temperature, and vibration-invariant output. For example, the controller may be coupled to one or more heating elements thermally coupled to one or more optical waveguide or photonic circuit elements.

Current through the heaters can be controlled by the controller so as to maintain a particular temperature of the photonic elements, ensuring consistent performance thereof. This is merely one example; a controller as described herein can be configured to modify and/or control one or more frequency, amplitude, and/or phase characteristics of light passing through any suitable portion of a photonic integrated circuit as described herein.

In many embodiments, and as noted above, the photonic integrated circuit of a signal generator as described herein is configured to provide a stable soliton pulse train output as input to excite a photosensitive region/area of a high-speed photodiode which, in response, provides a frequency and phase stable sinusoidal electrical output.

The photodiode (which may be integrated or discrete) can be conductively and/or otherwise operably coupled to a phase accumulator input of a DDS, configured to produce a periodic output at a particular frequency in, as one example, the microwave band. For simplicity of description, a DDS as described herein is understood to provide a sinusoidal output, but it may be appreciated that other waveforms may be used in other embodiments, such as square waves, triangular waves, sawtooth waves, or any other suitable periodic waveform, samples of which can be stored in a look-up table or other memory structure (whether digital or analog) of the DDS.

In many embodiments, the photonic integrated circuit of a microwave signal generator as described herein includes a laser light source configured to output narrow-band laser light at center frequency referred to herein as an "optical carrier" frequency. The laser light source may be a distributed feedback laser, although in other embodiments other laser light sources may be suitable.

The laser light source is optically coupled (via a photonic wire bond in one embodiment, or a tapered waveguide in another embodiment) to a waveguide, which can be formed from a material such as silicon nitride, aluminum nitride, chalcogenide, lithium niobate, indium phosphide, crystalline silicon, or any other suitable materials. As a result of this construction, laser light output from the laser light source can be confined within the waveguide.

A wavelength locking resonator, which may be a ring resonator, is positioned adjacent to the waveguide. As a result of this construction, a portion of light confined by the waveguide couples into the wavelength locking resonator. Light confined by, and resonating within, the wavelength locking resonator thereafter interacts with, and interferes with, light confined by the waveguide. More specifically, as may be appreciated by a person of skill in the art, bandwidth of light confined by the waveguide may be further narrowed by interaction with light coupling from the wavelength locking resonator back into the waveguide. In other cases and constructions, other photonic or optical elements may be used in addition or in the alternative to reduce linewidth of an optical signal as described herein, such as a Bragg grating.

After linewidth narrowing by the wavelength locking resonator, light confined by the waveguide can couple into a Mach-Zehner Interferometer (MZI) or other modulation structure (e.g., acousto-optic modular) that can be leveraged by the controller to further tune amplitude, phase, and/or frequency of linewidth-narrowed light confined by the waveguide. In some cases, an MZI may not be required and/or may be replaced by another photonic switching element. In these constructions, the MZI or other modulation structure can be used for relative intensity noise cancellation/reduction or other noise cancellation/reduction operations.

A high-Q resonator (which may be a multimode resonator or single mode resonator), which in some configurations can be configured for a whispering gallery mode operation, is positioned adjacent to the waveguide, after the wavelength locking resonator and MZI. As a result of this construction, output of the MZI (confined by the waveguide) can optically couple at least a portion of its contained light into the high-Q resonator, in some cases via a photonic wirebond. As used herein, "high-Q" refers to a resonator with a quality factor exceeding 100,000. In some cases, a high-Q factor may exceed several million. In some cases, a high-Q factor can exceed a billion.

In this manner, light confined within, and moving through, the high-Q resonator can thereafter optically couple back into the waveguide (e.g., via a photonic wirebond, as one example) and/or interact with, and/or interfere with, the linewidth-narrowed light confined by the waveguide. More specifically, as a result of the operation of the high-Q resonator, a soliton pulse train is introduced into the waveguide. In some embodiments, the high-Q resonator may be a multimode oscillator which may improve coupling tolerances when manufacturing.

As may be appreciated by a person of skill in the art, the frequency spectrum of the soliton pulse train confined within the waveguide, after interacting with the high-Q resonator, resembles a frequency comb. However, in many real-world implementations, the comb may retain significant frequency content at or around the optical carrier frequency, which may result is a sub-optimal soliton pulse shape in the time domain.

To mitigate effects of residual optical carrier content in each soliton pulse, the soliton pulse train (confined by a waveguide after interacting with the high-Q resonator) can be thereafter optically coupled into a second filtering resonator that serves to further extract residual optical carrier spectral content, further refining the time-domain shape of each soliton of the soliton pulse train, which in turn further improves the stability of the period separating each soliton pulse.

As noted above, the refined soliton pulse train is thereafter optically coupled to a high speed photodiode, which, when excited by a refined soliton of the soliton pulse train, generates an electrical signal having, in some cases, a sinusoidal shape. In other cases, a series of electrical pulses may be output by the photodiode. In other cases, more than one photodiode may be used for, as one example, balanced detection. This electrical signal is thereafter provided as input to the phase accumulator input of the DDS, thereby causing an analog output of the DDS to transition to the next angular value of the particular periodic waveform that the DDS is configured, at that moment, to output.

Further embodiments described herein relate to manufacturing of photonic elements that may be used to define a photonic integrated circuit as described herein. In particular, a photonic integrated circuit as described above can include semiconductor components, silicon nitride waveguides, and silicon components. As may be known to a person of skill in the art, these different photonic circuit elements require different manufacturing techniques, some of which may be thermally, chemically, or mechanically incompatible with one another.

As a result, embodiments described herein further relate to systems and methods for co-manufacturing silicon nitride ("SiN") waveguides and silicon waveguides for hybrid photonic systems (e.g., systems and/or circuits including both SiN waveguides and silicon waveguides) in a single manufacturing process. The method(s) of fabrication described herein result in nanoscale or microscale optical and/or electrical structures that exhibit dramatically improved optical and electrical performance over conventionally-produced hybrid photonic systems.

More specifically, embodiments described herein can be leveraged to produce hybrid photonic systems and circuits, and associated semiconductor electronics—including a photonic integrated circuit configured for use with a signal generator as described herein—that include (1) silicon waveguides having annealed claddings and (2) annealed SiN waveguides (and claddings), without risking damage to any semiconductor electronics or temperature-sensitive components (e.g., metallizations, implants, semiconductor switches and traces, and so on) that would otherwise be damaged or vaporized by the high temperatures required to anneal claddings and/or SiN depositions. As such, a hybrid photonic system produced according to methods described herein can leverage substantially improved optical performance (e.g., low propagation loss) as compared to SiN waveguides (and claddings) processed with strict thermal budget limitations, resulting in overall improved device performance.

More specifically, embodiments described herein manufacture a hybrid photonic system or, more particularly, photonic elements thereof, in a three-phase process. A first phase of the manufacturing process comprises defining one or more silicon structures that are configured to operate as silicon waveguides and/or are configured to provide a substrate for further complementary metal oxide semiconductor ("CMOS") manufacturing operations, such as those that may be employed to define one or more semiconductor switches.

A second phase of the manufacturing process buries the result of the first phase below a cladding that may be annealed at high temperature (because the silicon structure has not yet been processed to include any temperature-sensitive processes, structures, or regions). The second phase also defines one or more SiN waveguide layers which also may be annealed and/or buried within an annealed cladding.

The third phase of the manufacturing process trenches into the result of the second phase in order to expose a surface of the silicon structure formed in the first phase. Through this trench, one or more CMOS or other low-temperature or temperature-sensitive operations can be performed. Thereafter, the exposed region can be passivated by disposing an oxide layer thereupon and, in many cases, defining one or more vias through the oxide layer so as to conductively couple to one or more portions of an electrical circuit defined during the third phase. As a result of this manufacturing technique, both high-temperature processing operations (that improve optical performance) and low-temperature processing operations (that define optoelectronic or thermo-optic circuits) can be performed to the same substrate. In some examples, the trenching operation can be applied differently in different regions of the silicon structure. For example, in some embodiments, trenching can be continued after an initial trench reaches the surface of the silicon structure(s) formed in the first phase. For example, deep trenching operations can be performed, optionally extending into a bulk silicon substrate supporting the entire photonic circuit structure, to define one or more cavities into which one or more photonic/optical components may be placed or positioned, such as laser elements or resonating elements.

In addition, as may be appreciated, because many processes described herein are non-bonding processes, relative alignment between different waveguides (and, in particular, transitions between waveguides of different materials) can be well-controlled. As a result, losses at transitions between waveguides are also reduced compared against hybrid photonic circuits produced or manufactured via bonding processes.

These foregoing and other embodiments are discussed below with reference to FIGS. 1-7. However, those skilled in the art will readily appreciate that the detailed description given herein with respect to these figures is for explanation only and should not be construed as limiting.

In particular, FIG. 1 depicts an example signal generator as described herein. The signal generator 100 can be disposed within a small form-factor housing, such as the housing 102. The housing 102 can be formed from any suitable material, in any suitable manner. In some cases, the housing 102 is a clamshell housing having an upper part and a lower part. In some cases, the housing 102 may be formed from plastic, whereas in other cases, the housing 102 may be formed at least in part from metal.

In some cases, the housing 102 may be formed with one or more vibration dampening structures or materials, such as foam materials. Further, although the housing 102 is depicted as taking a cubic shape, this is not required of all embodiments; any suitable shape and/or proportions between length, width, and/or height may be selected in further embodiments.

The signal generator 100 also includes an input port 104 and an output port 106. The input port 104 can provide a configuration interface to define one or more signal characteristics of an output provided via the output port 106. For example, in some embodiments, the input port 104 may be a digital data transfer port, such as a USB port or ethernet port, configured to receive configuration information and/or control information 108 in a digital format. Example configuration/control information may be an output frequency of a sinusoidal wave to be output as an output 110 from the output port 106.

In other cases, the input port 104 may be configured to receive an analog input, such as a voltage. In these cases, a voltage level (and/or a duty cycle, or other analog signal characteristic) can be provided as the control information 108 and may be proportionately related to the output 110 provided via the output port 106.

In some cases, the input port 104 may likewise be configured to receive electrical power to operate the signal generator 100. The received electrical power can be direct current or alternating current or a DC-biased alternating current.

In further examples, the signal generator 100 can be wirelessly powered.

These foregoing examples are not exhaustive of the attributes and/or properties of a signal generator as described herein. To the contrary it may be appreciated that in many embodiments, a signal generator can take another form than that shown in FIG. 1. For example, in some cases, a signal generator as described herein can be integrated into a larger electronic device or component, for example as a clock source of a computing resource or device. In such cases, a housing such as the housing 102 may not be required. Likewise, the input port 104 and/or the output port 106 may not be required.

More broadly, it may be appreciated that these foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
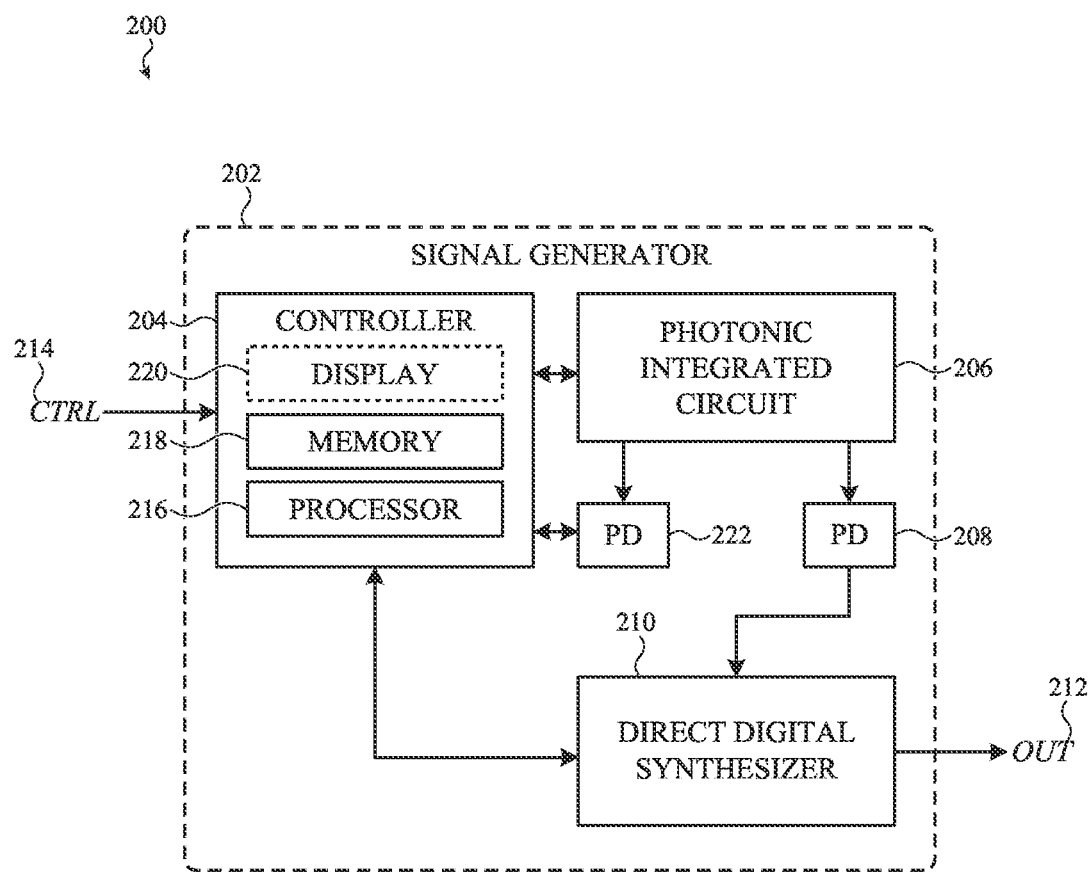
FIG. 2 depicts a system diagram of a signal generator, such as described herein.

FIG. 2 depicts a system diagram of a signal generator, such as the signal generator depicted in FIG. 1. The signal generator 200 can be disposed within a housing 202 that is configured to enclose, support, or otherwise retain a controller 204 and a photonic integrated circuit 206.

The controller 204, as with other embodiments described herein, is configured to operate and/or control the operation of the photonic integrated circuit 206. The photonic integrated circuit 206 is configured to provide as output a train of solitons which, in some examples, may be Dissipative Kerr Solitons ("DKS"). More specifically, an output of the photonic integrated circuit 206 is optically coupled to a photosensitive region of a high speed photodiode, identified as the photodiode 208. The photodiode 208 receives each soliton output from the photonic integrated circuit 206 and generates an electrical signal in response, thereby converting the sequence of solitons into a sinusoidal electric signal.

The electrical impulses output from the photodiode 208 are provided as input to a direct digital synthesizer 210. Specifically, the electrical impulses are provided as input to a phase accumulator (or clock) input of the direct digital synthesizer 210.

As noted with respect to other embodiments described herein, each electrical impulse received by the direct digital synthesizer 210 causes the direct digital synthesizer 210 to shift the phase of the waveform it is configured to output by one angular increment. The output of the direct digital synthesizer 210 is depicted in FIG. 2 as the output 212. In this manner, each electrical impulse causes the direct digital synthesizer 210 to output the next sample in a sequence of samples of a waveform, such as a sinusoidal waveform.

For example, in one embodiment, the direct digital synthesizer 210 can be configured to output a sinusoidal waveform with a resolution of 1024 samples per period. The soliton pulse train output from the photonic integrated circuit 206 may be provided at a rate of 300 GHz. In this example, the direct digital synthesizer 210 outputs a complete period of a sine wave every 1024 solitons, or a sine wave having a frequency of 292.968 MHz.

In another example, the direct digital synthesizer 210 can be configured to output a sinusoidal waveform with a resolution of 512 samples per period. As with preceding embodiments, the soliton pulse train output from the photonic integrated circuit 206 may be provided at a rate of 300 GHz. In this example, the direct digital synthesizer 210 outputs a complete period of a sine wave every 512 solitons, or a sine wave having a frequency of 585.937 MHz.

In another example, the direct digital synthesizer 210 can be configured to output a sinusoidal waveform with a resolution of 16 samples per period. As with preceding embodiments, the soliton pulse train output from the photonic integrated circuit 206 may be provided at a rate of 300 GHz. In this example, the direct digital synthesizer 210 outputs a complete period of a sine wave every 16 solitons, or a sine wave having a frequency of 18.75 GHz.

In another example, the direct digital synthesizer 210 can be configured to output a sinusoidal waveform with a resolution of 8 samples per period. As with preceding embodiments, the soliton pulse train output from the photonic integrated circuit 206 may be provided at a rate of 300 GHz. In this example, the direct digital synthesizer 210 outputs a complete period of a sine wave every 16 solitons, or a sine wave having a frequency of 37.5 GHz.

In view of the foregoing examples, it may be appreciated that, by selecting a number of samples as an input configuration for the direct digital synthesizer 210, the direct digital synthesizer 210 can be configured to output any suitable frequency of sinusoid. Further, although the preceding examples were all factors of two, it may be appreciated that this is merely one example; on other cases, the direct digital synthesizer 210 can be configured to overflow at any suitable number of samples.

Furthermore, it may be appreciated that the soliton rate provided above is merely one example; solitons in other examples may be provided as output at a different rate. In many cases, the rate of the soliton output from the photonic integrated circuit 206 may be based at least in part on a construction and/or operational mode of a laser light source of the photonic integrated circuit 206 and/or a geometry of one or more circuit elements of the photonic integrated circuit 206. For example, as noted above, the photonic integrated circuit 206 includes a high-Q resonator configured for, in some examples, whispering gallery mode operation. In other cases, the high-Q resonator can be configured to resonate without leveraging a whispering gallery mode of operation. As may be appreciated, dimensions and/or optical properties (e.g., refractive index) selected for the high-Q resonator can inform at what frequency solitons are output therefrom.

More broadly, it may be appreciated that the signal generator 200 can be configured to provide the output 212 at any suitable frequency. In particular, the controller 204, in some embodiments, may be configured to receive a control signal 214 from an external resource, such as a separate computing device, an analog input apparatus, or any other suitable input source. This control signal 214 can inform the controller 204 to cause the direct digital synthesizer 210 to select a particular waveform and a particular frequency at which to repeat that waveform. In other examples, the control signal 214 can be received directly by the direct digital synthesizer 210. In yet other examples, the control signal 214 can be routed partially to the controller 204 and partially to the direct digital synthesizer 210. These examples are not exhaustive; it may be appreciated that the signal generator 200 can be configured to receive and/or apply any suitable configuration to the direct digital synthesizer 210 in any suitable digital or analog manner.

The controller 204 can be implemented in a number of suitable ways. For example, in one embodiment, the controller 204 is defined at least in part by a processor 216 and a memory 218. In such configurations, the processor 216 can be configured to access the memory 218 to retrieve therefrom at least one executable asset, such as a binary executable file and/or one or more executable instructions. By cooperation with the memory 218, the processor 216 can instantiate an instance of software—referred to herein as a firmware instance—that, in turn, executes one or more control routines to perform, coordinate, or otherwise execute one or more operations of the signal generator 200.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, as described herein, the term "memory" refers to any software and/or hardware-implemented digital data storage device or circuit physically and/or structurally configured to store, in a volatile and/or nonvolatile manner, one or more digital representations of data or data objects. This term is meant to encompass both memory structures and databases, as well as the physical media supporting storage thereof.

In some embodiments, the signal generator 200 can also include a display 220. The display 220 can be operably intercoupled with the processor 216 and/or the memory 218 and may be configured to display information instructed by a firmware instance. Example information that may be displayed by the display 220 can include, but may not be limited to, a waveform type configured to be output by the direct digital synthesizer 210, a frequency at which the direct digital synthesizer is configured to output the waveform, and so on. In other cases, other configuration parameters may be shown via the display 220. In still further examples, the display 220 can be configured to render a graphical user interface or console interface defined at least in part by firmware instantiated by cooperation of the processor 216 and the memory 218.

In some embodiments, another photodiode, such as the photodiode 222 can be included to provide feedback to the controller 204. For example, the photodiode 222 can optically tap into any suitable portion of the photonic integrated circuit 206 to monitor one or more performance or operational characteristics thereof.

These foregoing examples are not exhaustive of the attributes and/or properties of a signal generator as described herein. To the contrary it may be appreciated that, in many embodiments, a signal generator can take another form than that shown in FIG. 2. More broadly, it may be appreciated that these foregoing embodiments depicted in FIG. 2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 3:
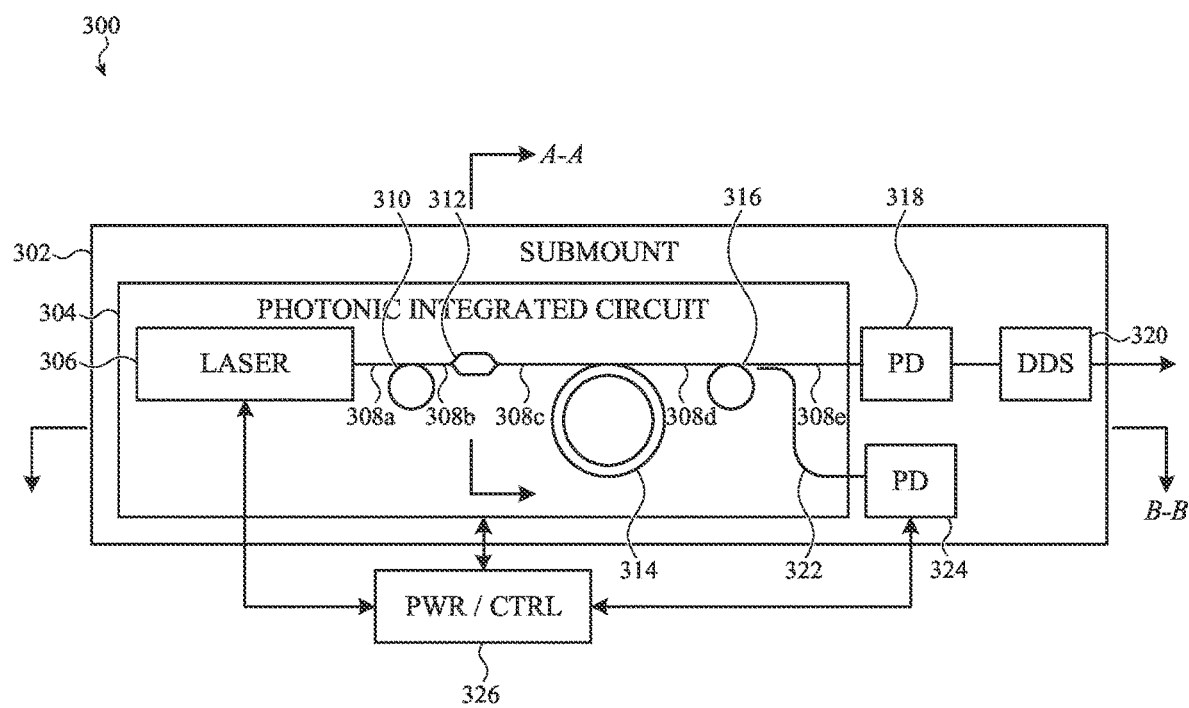
FIG. 3 depicts a simplified plan/schematic diagram of a signal generator incorporating a photonic integrated circuit, such as described herein.

For example, FIG. 3 depicts a simplified schematic diagram and/or plan diagram of a signal generator as described herein.

The signal generator 300 includes a base substrate that can support and/or serve as a base onto which other components of the signal generator 300 can be formed and/or otherwise disposed. In some cases, the base substrate—which is identified as the sub-mount 302—can be formed from bulk silicon, although this is not required of all embodiments.

Onto the sub-mount 302 can be formed a photonic integrated circuit 304. The photonic integrated circuit 304 can include a laser 306, which may be, in some embodiments, a distributed feedback laser. In other cases, a different laser may be used. In still further embodiments, the photonic integrated circuit 304 may not require an integrated laser source; instead, the photonic integrated circuit may receive laser light from an external source, such as via a fiberoptic cable or fiber coupling. However, for simplicity of description and illustration, the signal generator 300 is depicted with an incorporated laser, the laser 306. The laser 306 may be coupled (e.g., soldered, or adhered) to either a substrate associated with the photonic integrated circuit or, in some cases, directly to the sub-mount 302.

Laser light output from the photonic integrated circuit 304 can be confined within a waveguide having multiple discrete portions. Collectively, multiple portions of the waveguide are the portions 308a-308e. Collectively, the waveguide can be referred to as the waveguide 308. In these constructions, light output from the photonic integrated circuit 304 is confined by a first portion 308a of the waveguide 308.

The photonic integrated circuit 304 includes a wavelength locking resonator 310. Some embodiments may make use of a Pound-Drever-Hall (PDH) servo loop to stabilize the light frequency with respect to one or more of the resonators. In some embodiments, the PDH loop may be operated in an offset frequency manner.

As a result of the positioning depicted in FIG. 3, at least a portion of the light contained in the first portion 308a of the waveguide 308 is optically coupled into the wavelength locking resonator 310, and once that light traverses the wavelength locking resonator 310, at least a portion of that light will optically couple back into the waveguide 308, constructively and/or destructively interfering with light confined in the first portion 308a, thereby further narrowing the bandwidth of light output from the laser 306. Linewidth narrowed light is confined within a second portion 308b of the waveguide 308.

The photonic integrated circuit 304 also includes, in many examples, an MZI 312 which can be electronically controlled to adjust phase and/or amplitude of light confined to the second portion 308b of the waveguide 308. In many cases, the MZI 312 can be leveraged to ensure that a phase and/or amplitude of light within the second portion 308b is consistent. Modified linewidth narrowed light output from a branch of the MZI 312 is confined within a third portion 308c of the waveguide 308.

The photonic integrated circuit 304 also includes a high-Q resonator, identified as the main resonator 314. The main resonator 314 may be formed from a crystalline material such as magnesium fluoride (MgF2), although this is not required of all embodiments. In some cases, the main resonator 314 can include one or more axial protrusions that facilitate a whispering gallery mode of operation.

As with the wavelength locking resonator 310, the main resonator 314 is formed and/or disposed adjacent to the waveguide 308, specifically to optically couple (e.g., via a photonic wirebond, in one example) to the third portion 308c of the waveguide 308. More particularly, as a result of this positioning, at least a portion of the light contained in the third portion 308c of the waveguide 308, optically coupled into the main resonator 314 and upon resonance, enters a whispering gallery mode (although this mode of operation may not be required of all embodiments). As a result of this construction and mode of operation, once light confined by the main resonator 314 returns toward the waveguide 308, at least a portion of that light will optically couple back into the waveguide 308, injecting a train of solitons into the third portion 308c. The train of solitons, along with any residual optical carrier from the laser 306, is thereafter confined in a fourth portion 308d of the waveguide 308.

In some cases, light can couple (e.g., via a photonic wirebond) between the waveguide 308 and the main resonator 314 based on positional proximity between the optical elements. In some cases, maintaining relative positioning between the waveguide 308 and the main resonator 314 may present manufacturing challenges. In such examples and/or in some embodiments, optical coupling to and from the main resonator 314 can be accomplished via a photonic wirebond or other single-mode or low-loss waveguide. In some cases, a tapered waveguide can be positioned near an edge of the main resonator 314 and may be oriented in any suitable direction. In some cases, a waveguide coupling light into the main resonator 314 may be different and separate from a waveguide coupling light from the main resonator 314. Many configurations are possible.

To remove potentially negative effects of a residual optical carrier in the waveguide, the photonic integrated circuit 304 further includes a refining resonator 316 which is configured to extract residual optical carrier spectral energy, leaving only well-defined/refined solitons to propagate into a fifth portion 308e of the waveguide 308.

The refined sequence of solitons confined by the fifth portion 308e of the waveguide 308 can be provided as input to a high-speed photodiode 318 (which may be an integrated or a discrete component), which as described above can generate an electrical impulse in response. In some cases, the high-speed photodiode 318 can be operated in a biased mode so as to respond substantially instantaneously to illumination by a soliton. In other cases, this may not be required.

Output of the high-speed photodiode 318 is provided as electrical input to a phase accumulator input of a direct digital synthesizer 320, such as described herein, which in turn can provide an analog output corresponding to a current setting thereof.

In some constructions, the fifth portion 308e can be formed with a coupler 322 that directs light confined in the fifth portion 308e toward a second diode 324 which, in turn, can provide feedback to a controller 326.

The controller 326, as with other embodiments described herein, can be configured to control one or more photonic circuit elements of the photonic integrated circuit 304, such as controlling an amount of current applied to a heater or heating element configured to normalize the temperature of one or more portions of the waveguide 308 or one or more arms of the MZI 312. In many embodiments, the controller 326 can also provide power to the various electrical loads of the signal generator 300.

These foregoing examples are not exhaustive of the attributes and/or properties of a signal generator as described herein. To the contrary it may be appreciated that, in many embodiments, a signal generator can take another form than that shown in FIG. 3.

More broadly, it may be appreciated that these foregoing embodiments depicted in FIG. 3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, it may be appreciated that the photonic integrated circuit depicted in FIG. 3 can be manufactured in a number of suitable ways. In addition, it may be appreciated that the various photonic circuit elements of the photonic integrated circuit can take different forms and/or may be made from different materials in certain embodiments. For example, in some cases, the waveguide may be made from a crystalline silicon whereas, in other embodiments, silicon nitride may be used. In other cases, other materials suitable for optical waveguides may be used in whole or in part to define one or more optical waveguides and/or optical couplings as described herein. For example, in some cases, aluminum nitride, chalcogenide, lithium niobate, or indium phosphide may be used. In yet other embodiments, one or more components of a system described herein can be fully discrete or fully integrated and co-formed. For example, in some cases, a laser light source may be formed with a photonic structure such as described above. In other cases, the laser light source may be a discrete component placed and/or aligned to a photonic structure as described above. In many cases, the laser light source may be configured to output infrared light, but this is not required of all embodiments.

FIGS. 4A-4E depict sequential cross sections, taken through line A-A of FIG. 3, corresponding to intermediate steps of manufacturing the photonic integrated circuit of FIG. 3, following at least a portion of a method of manufacturing a photonic integrated circuit including multiple waveguide types, multiple waveguide architectures, and so on in addition to one or more silicon semiconductor circuits, as described herein.

A person of skill in the art will readily appreciate that implementations of the methods described herein may be used to manufacture any photonic circuit, electro-photonic circuit, thermo-optic circuit, or any combinations thereof, of any suitable complexity leveraging any suitably sized die.

More broadly, the simplified examples provided herein are merely presented to illustrate manufacturing techniques that, in turn, can be applied to manufacture portions or entireties of active or passive electronics and/or photonics integrated circuits of any suitable complexity. The following cross sections are merely examples, and should not be construed as limiting the methods disclosed herein to only the precise forms described in reference to the following described figures.

Figure 4A:
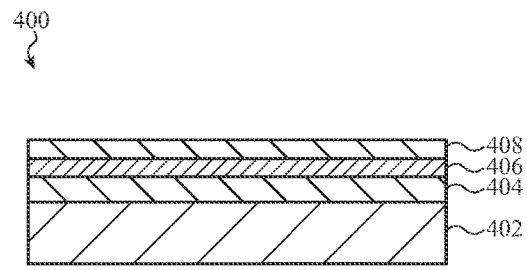
FIGS. 4A-4E depict sequential cross sections, taken through line A-A of FIG. 3, corresponding to intermediate steps of manufacturing the photonic integrated circuit of FIG. 3, following at least a portion of a method of manufacturing a waveguide, as described herein.

In particular, FIG. 4A depicts a cross section 400 of an intermediate stage of manufacturing of an optoelectric structure that may define a portion of a photonic integrated circuit, such as described herein that, in turn, may be incorporated into a signal generator as described herein. The optoelectric structure in FIG. 4A can be formed at any suitable scale and a person of skill in the art may appreciate that relative size, dimensions, and/or layout of features varies from embodiment to embodiment and implementation to implementation.

More specifically, FIG. 4A depicts a starting substrate. The starting substrate depicted in the cross section 400 includes many layers of chemically or structurally discrete materials, although it may be appreciated that boundaries between the depicted layers may transition over a distance that varies from embodiment to embodiment.

The cross section 400 depicts a bulk silicon layer 402 that may be any suitable thickness. Formed onto and/or into the bulk silicon layer 402 is an oxide layer 404, which may comprise silicon dioxide ($SiO_2$).

The oxide layer 404 can be formed by any suitable process or technique, whether active or passive. The oxide layer 404 may be a thermal oxide and/or a deposited oxide. In other cases, certain regions of the oxide layer 404 may be thermal oxide whereas other regions may be deposited oxide. In some cases, a multi-layer process may be used to form the oxide layer 404. For example, a thermal oxide may be formed into the bulk silicon layer 402 after which one or more deposited oxide layers may be disposed, grown, or otherwise formed.

One example process or technique by which the oxide layer 404 may be formed includes placing the bulk silicon layer 402 in a furnace to form a thermal oxide layer. The furnace may be a vertical furnace or a horizontal furnace; any suitable furnace or orientation may be used. The oxide layer 404 can be formed in a layer of uniform thickness or, in some cases, the oxide layer 404 may be formed to a particular desired profile.

The oxide layer 404 is shown as extending across an entire width of the bulk silicon layer 402, but it may be appreciated that this is not required of all embodiments. For example, in some embodiments, the oxide layer 404 is formed in a pattern over the bulk silicon layer 402 (and/or into the bulk silicon layer 402), for example by leveraging a local oxidation technique.

As with other layers of material described herein, the oxide layer 404 can be formed to any suitable thickness. One example thickness is on the order of 2-15 micrometers. In other cases, a thinner or a thicker layer of the oxide layer 404 may be formed. In many cases, a thickness of the oxide layer 404 is determined based on an optical property of the oxide layer 404 at the selected thickness. In other words, a thickness of the oxide layer 404 may be determined so that the oxide layer 404 can provide mechanical support and/or optical functionality to other layers of the optoelectric structure.

Disposed over the oxide layer 404 is a silicon layer 406. The silicon layer 406 can be amorphous or crystalline and may be formed using any suitable process or technique, which may be known to a person of skill in the art. Example processes can include seed methods, chemical vapor deposition, sputtering, wafer bonding, and so on.

In other cases, the silicon layer 406 and the oxide layer 404 can be formed in the same or similar processes. For example, the bulk silicon layer 402 can be subjected to an oxygen implantation technique and thereafter annealed or otherwise exposed to high temperature. In this process, the oxide layer 404 may separate the bulk silicon layer 402 from the silicon layer 406.

As with other layers, depositions, formations, or features described herein, the silicon layer 406 is shown as extending across an entire width of the bulk silicon layer 402 and the oxide layer 404, but it may be appreciated that this is not required of all embodiments. For example, in some embodiments, the silicon layer 406 is formed in a pattern over the oxide layer 404 (and/or into the oxide layer 404 or the bulk silicon layer 402).

As with other layers of material described herein, the silicon layer 406 can be formed to any suitable thickness. One example thickness is on the order of 200-500 nanometers. In other cases, a thinner or a thicker layer of the silicon layer 406 may be formed. In many cases, a thickness of the silicon layer 406 is determined based on an optical or electrical property of the silicon layer 406 at the selected thickness. In other words, a thickness of the silicon layer 406 may be determined so that the silicon layer 406 can provide preferred or ideal optical or electrical performance properties of the optoelectronic device or any electrical components (such as, but not limited to, CMOS, transistors, and so on).

In some cases, although not necessarily required of all embodiments, the silicon layer 406 may be doped to introduce or reduce charge carriers in the silicon layer 406. More simply, the silicon layer 406 with a suitable dopant may be either an n-type semiconductor or a p-type semiconductor. For simplicity of description, the embodiments that follow contemplate the silicon layer 406 as a p-type semiconductor, but it may be appreciated that this is not required of all embodiments and other implementations may prefer different dopants, dopant concentrations, and so on.

The foregoing examples are not exhaustive of all manufacturing methods that may be employed to obtain a silicon layer, such as the silicon layer 406, disposed over an insulator, such as the oxide layer 404. This structure, as may be known to a person of skill in the art, may be referred to as a "Silicon on Insulator" or "SOI" structure. Accordingly, more generally and broadly, FIG. 4A depicts a starting substrate as an SOI substrate. In some examples, an off-the-shelf SOI substrate may be used.

In some embodiments, a second oxide layer 408 can be disposed using a suitable technique over the silicon layer 406. In some cases, the second oxide layer 408 may be referred to as a cladding, an encapsulation layer, or a passivation layer that may serve, in part, to protect the silicon layer 406 from oxidizing or otherwise degrading during subsequent manufacturing steps and operations.

The second oxide layer 408 can be formed by a thermal growth process, chemical vapor deposition, or by any suitable process or technique.

As with other layers, depositions, formations, or features described herein, the second oxide layer 408 is shown as extending across an entire width of the bulk silicon layer 402, the oxide layer 404, and the silicon layer 406, but it may be appreciated that this is not required of all embodiments. For example, in some embodiments, the second oxide layer 408 is formed in a pattern over the silicon layer 406 (and/or into the silicon layer 406 or the oxide layer 404). In some cases, the second oxide layer 408 may form from the oxide layer 404.

As with other layers of material described herein, the second oxide layer 408 can be formed to any suitable thickness. One example thickness is on the order of 100-500 nanometers. In other cases, a thinner or a thicker layer of the second oxide layer 408 may be formed. In many cases, a thickness of the second oxide layer 408 is determined based on a mechanical or dielectric property of the second oxide layer 408 at the selected thickness.

In other words, a thickness of the second oxide layer 408 may be determined so that the second oxide layer 408 can provide mechanical, manufacturing, or electrical/dielectric support to other layers of the example optoelectric structure, whether such support is required for use in field or whether such support is required for subsequent manufacturing processes.

The stack-up shown in FIG. 4A can be subject to a series of lithography steps to define two or more silicon waveguides from the silicon layer 406. As known to a person of skill in the art, a lithographic mask, that is configured to define one or more features resulting from a subsequent subtractive manufacturing step (e.g., chemical etching, mechanical ablation, laser ablation, and so on), can be applied and/or formed in a number of suitable ways. For example, a lithographic mask can be formed from, and/or may include, any suitable number of materials including resins, polystyrenes, lacquers, and so on including one or more photoactive additives or compounds.

In many cases, after a lithographic mask is disposed on the surface of the second oxide layer 408, it may be developed or otherwise cured by exposing the lithographic mask and/or the entire stack-up to a curing condition dependent upon one or more properties of the lithographic mask itself.

After, and/or as a portion of curing, the lithographic mask may be exposed to light, such as ultraviolet light, or a focused beam of electrons, after which a particular pattern may be defined onto the second oxide layer 408. In some cases, subsequent cleaning of the lithographic mask may be required or preferred, in particular to remove any unnecessary portions of the lithographic mask.

The lithographic mask(s) may be a positive photoresist, but this may not be required of all embodiments. In other cases and other configurations, negative photoresist patterns may be used.

The lithographic mask(s) may be configured for use with a lithographic process, such as photolithography (configured to operate in either ultraviolet or visible light or any suitable band of light). In such examples, the lithographic mask may be a photoresist layer disposed using a suitable technique. The lithographic mask can be formed by any suitable process. As with other layers, depositions, formations, or features described herein, the lithographic mask is shown as extending in a particular defined pattern across a majority of a width of the stack-up, but it may be appreciated that this is not required of all embodiments. In some cases, the lithographic mask may define a localized pattern. In addition, as with other layers of material described herein, the lithographic mask can be formed to any suitable thickness, which may vary from process to process. One example thickness is on the order of 100-500 nanometers. In other cases, a thinner or a thicker layer of the lithographic mask may be formed.

Once a lithographic mask is applied, etching can be performed. An etching operation may have any suitable selectivity and any suitable isotropy/anisotropy. The etch may be a wet etch process or a plasma-phase process, and selection therebetween (or of another process or process type) may be based at least in part on design or manufacturing constraints.

For simplicity of description and illustration, lithographic deposition and etching steps are omitted from FIGS. 4A-4E. More broadly, in view of the foregoing, it may be appreciated that any suitable etching process suitable for use with the lithographic mask may be used. In some cases, a hydrofluoric etch may be performed. In other cases, a buffered etch (e.g., "BOE" or "buffered oxide etch") process may be performed. In yet other cases, laser etching, ablation, or mechanical etching may be suitable. A person of skill in the art may readily appreciate that suitable etching processes may differ from implementation to implementation and embodiment to embodiment.

The etch process may be terminated and/or stopped once a desired depth is achieved. As noted above, the termination of the etch may be defined, at least in part, by a selectivity of the etchant or etching process.

In other cases, the etch process may be stopped once that process has etched through an entirety or majority of the second oxide layer 408 (e.g., to a particular depth). In other cases, the etch process may be selective in that it is reactive only with the material of the second oxide layer 408.

Regardless of the process(es) (or process characteristics, such as etchant, duration, temperature, pressure, and so on) selected to leverage the pattern defined by the lithographic mask to etch through the second oxide layer 408, once the etch is completed, a hardmask layer may be defined. More specifically, once the second oxide layer 408 is patterned according to the lithographic mask, it may be referred to as a hardmask layer.

Thereafter, remaining portions of the lithographic mask may be removed, leaving behind the oxide layer 404, the silicon layer 406, and the hardmask layer. The lithographic mask can be removed using any suitable process, including stripping processes, cleaning processes, and so on. For example, the stack-up may be placed in a solvent bath, the solvent configured to interact with the material of the lithographic mask. In other cases, plasma photoresist stripping may be used. More generally, any suitable process, which may be specific to a material or bonding type of the lithographic mask, may be used to remove residual portions of the lithographic mask.

Figure 4B:
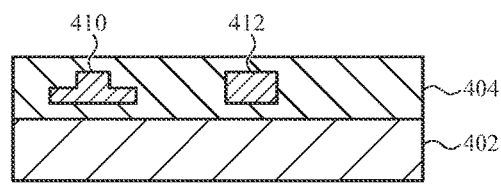

Another etching process can be performed after removing the lithographic mask. This second etching process leverages the pattern defined by the hardmask layer to define one or more features into the silicon layer 406, such as shown in FIG. 4B. More specifically, the hardmask layer defines (in the example embodiment) one or more silicon waveguides, such as the ridge waveguide 410 and the rectangular waveguide 412 shown in FIG. 4B.

Once the one or more silicon waveguides are formed by one or more etching/masking operations, the waveguides can be buried in a cladding or protective layer, such as shown in FIG. 4B in which the oxide layer 404 is extended to bury both the waveguides 410, 412.

Figure 4C:
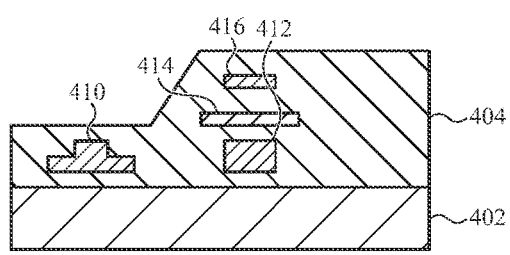

In this construction, additional masking and deposition operations can be performed that can result in formation of one or more other features, such as shown in FIG. 4C. In this example cross section, a silicon nitride waveguide 414 can be disposed above the waveguide 412 and a heating element 416 can be formed above the silicon nitride waveguide 414, prior to annealing the oxide layer 404. In these and other constructions, the oxide layer 404, which may be further grown/expanded from FIG. 4B, may be annealed in appropriate annealing conditions. In some cases, the oxide layer 404 may be annealed before being further grown/expanded. For example, portions of the oxide layer 404 below the heating element 416 may be annealed prior to the heating element 416 being disposed and thereafter buried in further oxide grown or disposed over the annealed oxide layer burying the waveguides 410, 412, and 414.

Figure 4D:
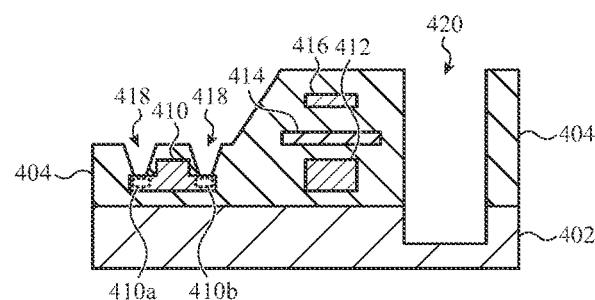

Thereafter, lower temperature operations can be performed. For example, as shown in FIG. 4D, an etching operation can define two trenches 418 that stop at the waveguide 410 such that the silicon material of the waveguide can be doped to define one or more doped regions 410a.

In addition, a deep trench 420 can be anisotropically etched through the oxide layer 404 and, in some cases, into the bulk silicon layer 402. The deep trench 420 can define a volume into which a main resonator and/or a laser light source (or other separately manufactured optical element, such as a reflector element, a filter element, a waveguide element, and so on) can be disposed.

Figure 4E:
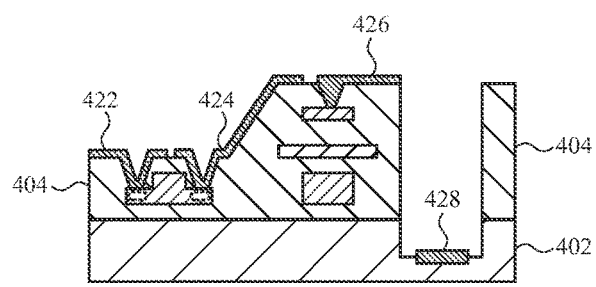

Finally, at FIG. 4E, a metallization operation can be performed to conductively couple to doped regions of silicon and/or to one or more heating elements. For example, a first electrode 422 can couple to a first doped region 410a, a second electrode 424 can conductively couple to a second doped region 410b, and a third electrode 426 can couple to the heating element 416. In some examples, a drive or ground electrode 428, suitable for powering a laser element disposed in the deep trench 420, can be disposed as the electrode 428.

These foregoing embodiments depicted in FIGS. 4A-4E and the various alternatives thereof and variations thereto are presented, generally, for purposes of explanation, and to facilitate an understanding of various configurations and constructions of method of manufacturing an optical structure, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5A:
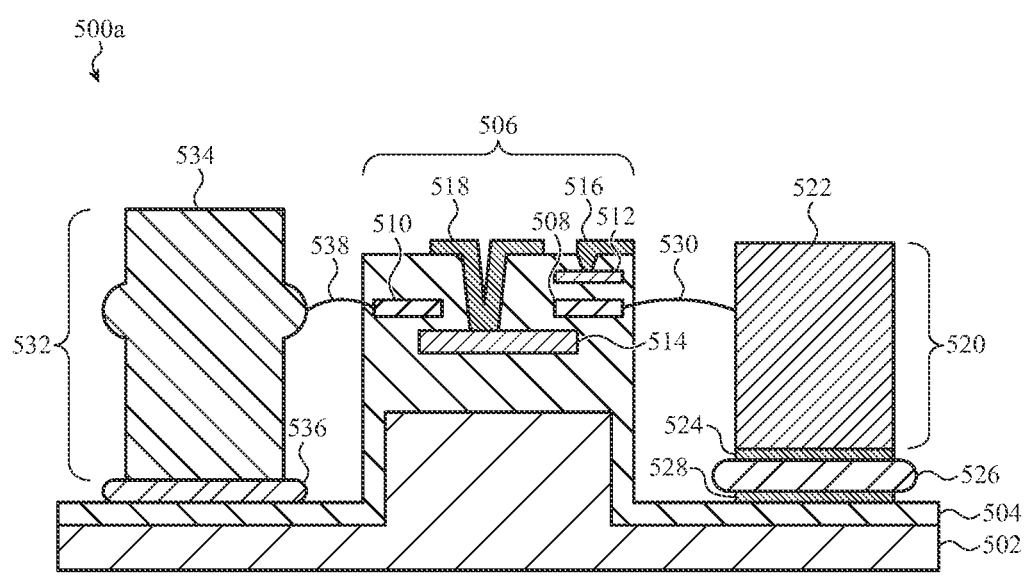
FIG. 5A depicts a cross section, taken through line B-B, of the signal generator of FIG. 3.

For example, FIG. 5A depicts a cross section, taken through line B-B, of the signal generator of FIG. 3.

In this example, the cross section 500a depicts a bulk silicon sub-mount 502 protected by an oxide layer 504. Over the oxide layer is disposed a set 506 of photonic circuit elements including a first silicon nitride waveguide 508, a second silicon nitride waveguide 510, a heating element 512, a silicon waveguide 514, and one or more electrodes such as an electrode 516 coupling to the heating element 512 and an electrode 518 coupling to the silicon waveguide 514, which can include one or more implanted heating elements or other semiconductor structures such as described above.

The cross section 500a also includes a laser module 520 that includes a laser element 522 (which may be a distributed feedback laser). The laser element 522 can be formed with an electrode 524 that is conductively coupled, via solder 526, to an electrode 528 formed onto the bulk silicon sub-mount 502. Output from the laser element 522 of the laser module 520 can be optically coupled to the first silicon nitride waveguide 508 via a suitable method, such as via a photonic wirebond 530.

The cross section 500a also includes a main resonator module 532 that includes a main resonator 534 configured for, in some examples, a whispering gallery operation. In other cases, the main resonator 534 may resonate in other modes. The main resonator 534 can be mechanically coupled to the bulk silicon sub-mount 502 via an adhesive 536. The main resonator 534 can be optically coupled to the second silicon nitride waveguide 510 via a suitable method, such as via a photonic wirebond 538.

These foregoing embodiments depicted in FIG. 5A and the various alternatives thereof and variations thereto are presented, generally, for purposes of explanation, and to facilitate an understanding of various configurations and constructions of method of manufacturing an optical structure that can serve as a signal source for a signal generator such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in other configurations, a main resonator (and/or other placed optical components) may be positioned in a different manner than that shown in FIG. 5A. As one example, FIG. 5B depicts a cross section 500b of an alternative configuration of the signal generator shown in FIG. 5A.

Figure 5B:
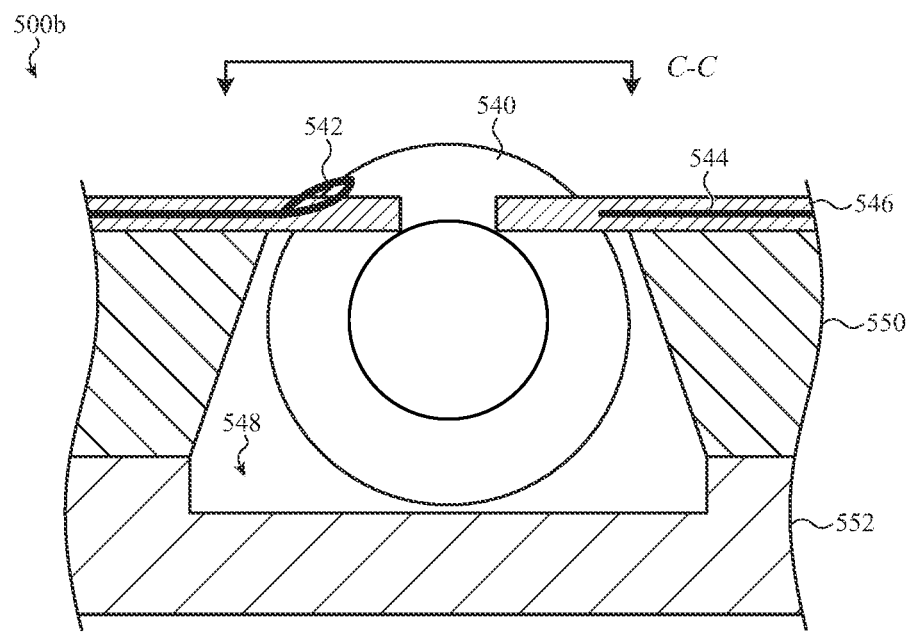
FIGS. 5B-5C depict separate views of an alternate configuration of the cross section of FIG. 5A.
Figure 5C:
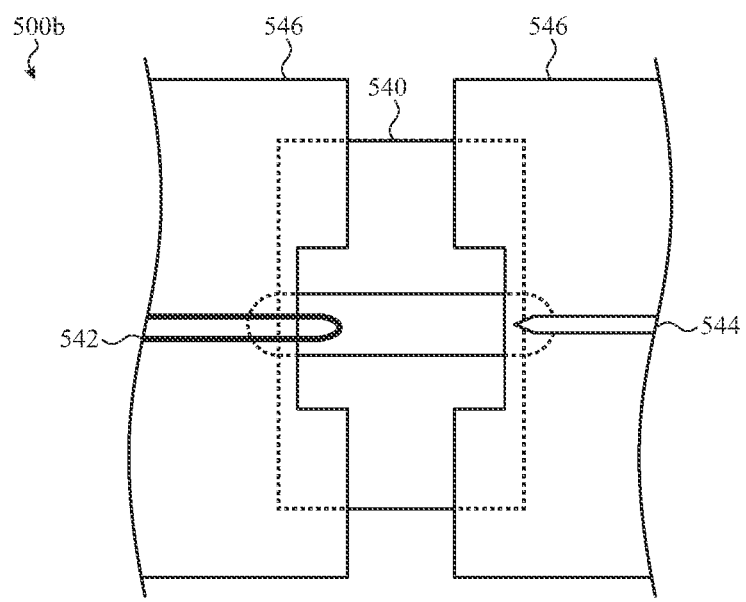

FIG. 5C depicts an alternate view of FIG. 5B, viewed through line C-C as shown in FIG. 5B.

In this embodiment, the main resonator 540 as shown in FIGS. 5B-5C can be optically coupled to one or more optical waveguides in one or more suitable ways, such as via a photonic wirebond 542 or by proximity, such as to the tapered waveguide 544, each of which may be defined within a cladding layer 546, which may—as in other embodiments—be formed from a silicon oxide. The cladding layer 546 can be formed with retaining geometry (such as shown in FIG. 5C) to accommodate one or more protruding rings of the main resonator 540. In other cases, the retaining geometry may not be required.

It may be appreciated that the photonic wirebond 542 (and associated waveguide) and the tapered waveguide 544 are merely examples and that many other suitable methods may be used to optically couple to the main resonator 540.

In this construction, the main resonator 540 is oriented perpendicular to the main resonator as shown in FIG. 5A. More particularly, or more simply, the main resonator 540 is positioned on its side, whereas the main resonator as shown in FIG. 5A is positioned along its base.

In the illustrated embodiment, the main resonator 540 may be deposited into a cavity 548 formed by etching through a bulk silicon layer 550, which may be a portion of a bulk silicon sub-mount, such as described above in reference to FIG. 5A. The etching and/or machining process(es) selected to define the cavity 548 may vary from embodiment to embodiment. In some embodiments, the cavity 548 may include one or more angled sidewalls that can be used to guide and/or refine positioning of the main resonator 540. It may be appreciated that the angle of the sidewalls can vary from embodiment to embodiment.

In some cases, the bulk silicon layer 550 can be supported by a stiffener or cap which may be formed from a rigid material such as copper tungsten. In the illustrated embodiment, the stiffening layer is identified as the stiffener 552.

These foregoing embodiments depicted in FIGS. 5B-5C and the various alternatives thereof and variations thereto are presented, generally, for purposes of explanation, and to facilitate an understanding of various configurations and constructions of a method of manufacturing an optical structure that can serve as a signal source for a signal generator such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6:
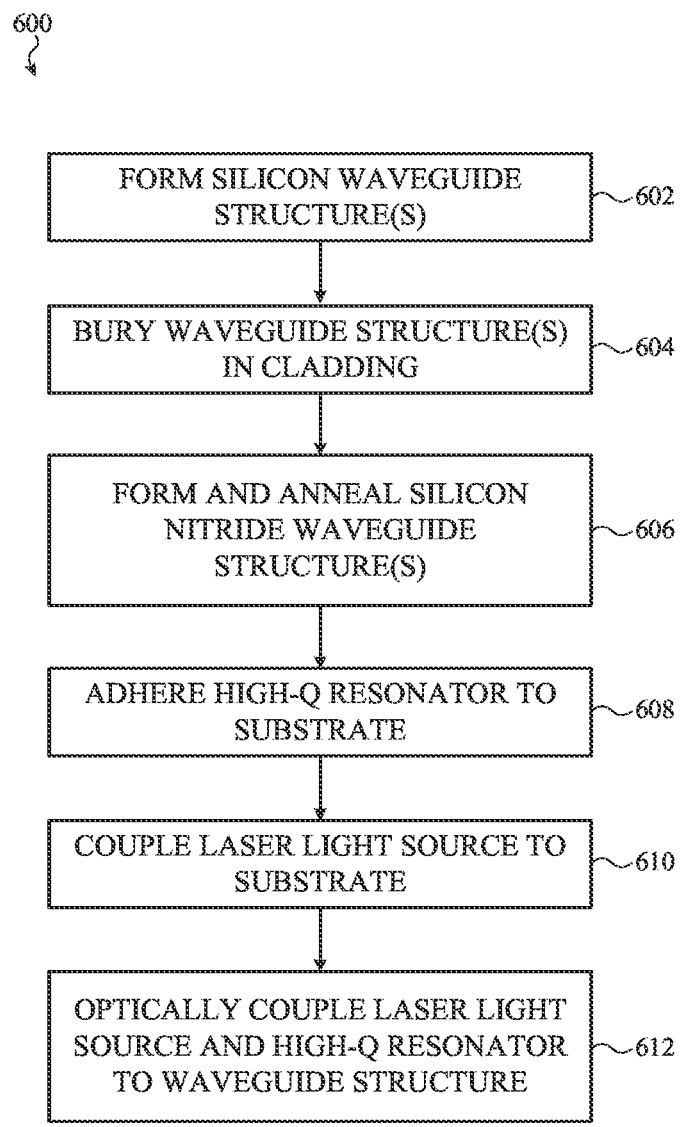
FIG. 6 is a flowchart depicting example operations of a method of co-manufacturing silicon waveguides, SiN waveguides, and semiconductor structures in a photonic integrated circuit, such as described herein.

FIG. 6 is a flowchart depicting example operations of a method of co-manufacturing silicon waveguides, SiN waveguides, and semiconductor structures in a photonic integrated circuit, such as described herein. The method 600 includes operation 602 at which a silicon waveguide structure is formed using a suitable process.

The waveguide can be formed from a silicon on insulator substrate or in another suitable manner (see, e.g., FIGS. 4A-4E). The method 600 also includes operation 604 during which the silicon waveguide structure is buried in an oxide layer, which is thereafter annealed to form a cladding. Hereafter, the method 600 advances to operation 606 at which a SiN waveguide is formed and annealed within a corresponding cladding. Next, at operation 608, a main resonator can be mechanically adhered to a base of a deep trench formed into the silicon on an insulator substrate. Next, at operation 610, a laser module or laser light source can be mechanically and/or conductively coupled to the same substrate within the same or a different deep trench. In some cases, alignment may be assisted and/or facilitated by one or more microelectromechanical system (MEMS) devices. Finally, at operation 612, the main resonator and the laser light source can be optically coupled to one or more formed waveguides, such as via a photonic wirebond.

Figure 7:
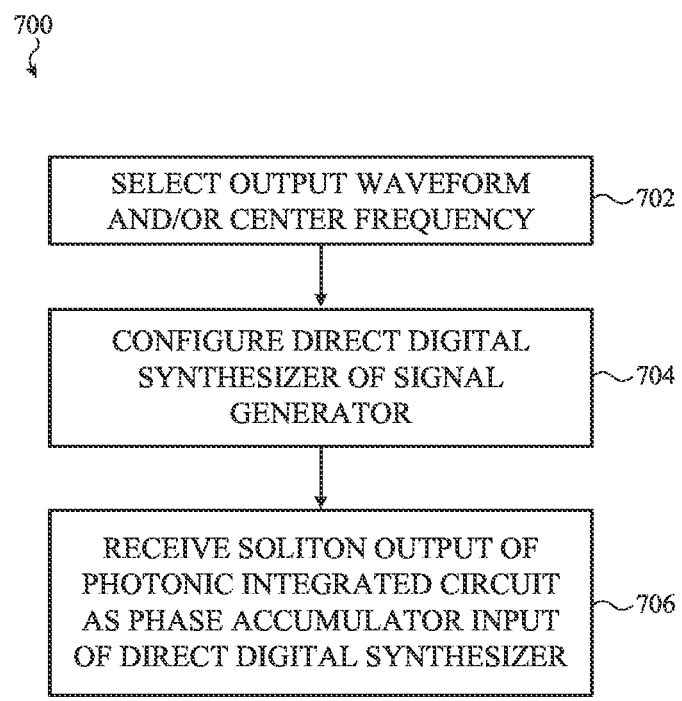
FIG. 7 is a flowchart depicting example operations of a method of operating a signal generator as described herein.

FIG. 7 depicts example operations of a method of operating a signal generator as described herein. The method 700 includes operation 702 at which an output waveform is selected, such as a sine wave or a square wave. Next, at operation 704, a direct digital synthesizer—such as described above—can be configured to output the selected waveform. Finally, at operation 706, the signal generator can generate and leverage a soliton pulse train to drive the direct digital synthesizer.

These foregoing embodiments depicted in FIGS. 6-7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As noted above, a signal generator and/or photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A signal generator comprising:
   a housing;
   a photonic integrated circuit disposed within the housing and comprising:
      a laser light source configured to output light centered at an optical carrier frequency;
      a waveguide configured to confine light output from the laser light source;
      a first resonator configured to:
         receive as input light confined by the waveguide output; and
         provide as output linewidth-reduced light;
      a main resonator configured to:
         receive as input the linewidth-reduced light; and
         provide as output a soliton pulse train;
      a second resonator configured to:
         receive as input the soliton pulse train;
         attenuate residual optical carrier frequency components from the soliton pulse train; and
         provide as output a filtered soliton pulse train; and
      a photodiode configured to:
         receive as optical input the filtered soliton pulse train; and
         provide as electrical output a first periodic electric signal; and
   a direct digital synthesizer disposed within the housing and comprising a phase accumulator input conductively coupled to the photodiode, the phase accumulator input configured to receive as input the first periodic electric signal and the direct digital synthesizer configured to provide as output of the signal generator a second periodic electric signal.

2. The signal generator or claim 1, wherein the second periodic electric signal has a center frequency between 100 megahertz (MHz) and 300 gigahertz (GHz).

3. The signal generator or claim 1, wherein the signal generator is a microwave signal generator.

4. The signal generator or claim 1, wherein the laser light source is a distributed feedback laser.

5. The signal generator of claim 1, wherein the first resonator is a wavelength locking resonator.

6. The signal generator of claim 1, wherein the laser light source is optically coupled to the waveguide via a photonic wirebond.

7. The signal generator of claim 1, wherein the main resonator is optically coupled to the waveguide via a photonic wirebond.

8. The signal generator of claim 1, further comprising a modulator interposing the first resonator and the main resonator.

9. The signal generator of claim 8, wherein the modulator comprises a Mach-Zehner Interferometer.

10. The signal generator of claim 1, wherein the main resonator is a high-Q resonator.

11. The signal generator of claim 10, wherein a quality factor of the main resonator is between 100,000 and 1,000,000.

12. The signal generator of claim 11, wherein the quality factor of the main resonator is between 1,000,000 and 1,000,000,000.

13. The signal generator of claim 12, wherein the main resonator is formed from magnesium fluoride.

14. The signal generator of claim 1, further comprising a controller disposed within the housing and operably coupled to the laser light source and the direct digital synthesizer, the controller configured to select a center frequency of the second periodic electric signal.

15. The signal generator of claim 14, wherein the second periodic electric signal comprises a sinusoidal signal.

16. A microwave signal generator comprising:
   a photonic integrated circuit comprising:
      a base substrate defining a first cavity and a second cavity;
      a laser light source disposed in the first cavity;
      a waveguide formed over the base substrate and optically coupled to an output of the laser light source;
      a first resonator formed over the base substrate and optically coupled to the waveguide;
      a main resonator disposed in the second cavity and optically coupled to the waveguide after the first resonator;
      a second resonator formed over the base substrate and optically coupled to the waveguide after the main resonator; and
      a photodiode configured to receive light output from the second resonator; and
   a direct digital synthesizer comprising a phase accumulator input conductively coupled to the photodiode and configured to provide as output of the microwave signal generator, a periodic electric signal having a center frequency between 30 megahertz (MHz) and 300 gigahertz (GHz).

17. The microwave signal generator of claim 16, wherein the main resonator and the laser light source are each optically coupled to the waveguide via a photonic wirebond.

18. The microwave signal generator of claim 16, wherein:
   the main resonator is a high-Q resonator; and
   the waveguide is formed from one of silicon or silicon nitride.

19. The microwave signal generator of claim 16, further comprising a housing enclosing the photonic integrated circuit and direct digital synthesizer, the housing having a volume of ten cubic centimeters or less.

20. The microwave signal generator of claim 16, wherein the laser light source is configured to output infrared light.

* * * * *